(12) United States Patent
Nishida et al.

(10) Patent No.: US 7,205,375 B2
(45) Date of Patent: Apr. 17, 2007

(54) OPTICAL DISK SUBSTRATE AND LIGHTGUIDE PLATE

(75) Inventors: Shintaro Nishida, Chiyoda-ku (JP); Kuniyuki Hayashi, Chiyoda-ku (JP); Hideyuki Tsunemori, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/509,592

(22) PCT Filed: Apr. 8, 2003

(86) PCT No.: PCT/JP03/04457

§ 371 (c)(1),
(2), (4) Date: Sep. 29, 2004

(87) PCT Pub. No.: WO03/085048

PCT Pub. Date: Oct. 16, 2003

(65) Prior Publication Data

US 2005/0106350 A1     May 19, 2005

(30) Foreign Application Priority Data

| Apr. 9, 2002 | (JP) | 2002-106488 |
| Apr. 12, 2002 | (JP) | 2002-110084 |
| Jul. 25, 2002 | (JP) | 2002-216598 |
| Jul. 25, 2002 | (JP) | 2002-216599 |
| Jul. 25, 2002 | (JP) | 2002-216600 |

(51) Int. Cl.
*C08G 64/00* (2006.01)

(52) U.S. Cl. .................. 528/196; 264/176.1; 264/219; 264/328.1; 359/109; 359/642; 528/198

(58) Field of Classification Search ............ 264/176.1, 264/219, 328.1; 359/109, 642; 528/196, 528/198
See application file for complete search history.

(56) References Cited

U.S. PATENT DOCUMENTS

| 5,138,001 A | * | 8/1992 | Ueda et al. | ................ 526/262 |
| 6,474,868 B2 | * | 11/2002 | Geyer et al. | ................ 384/49 |
| 6,908,655 B2 | * | 6/2005 | Arakawa et al. | ........... 428/64.1 |

FOREIGN PATENT DOCUMENTS

| JP | 2000-239513 |   | 9/2000 |
| JP | 2002121373 | * | 4/2002 |
| JP | 2002121374 | * | 4/2002 |

* cited by examiner

*Primary Examiner*—Terressa Boykin
(74) *Attorney, Agent, or Firm*—Wenderoth, Lind & Ponack, L.L.P.

(57) ABSTRACT

An optical disk substrate and a light guide plate which are formed from a resin composition comprising 0.1 to 20 parts by weight of compound represented by the following formula (I):

$$(R^1)_n \text{—Ar—X—Ar—}(R^2)_m \quad (I)$$

Figure 1:
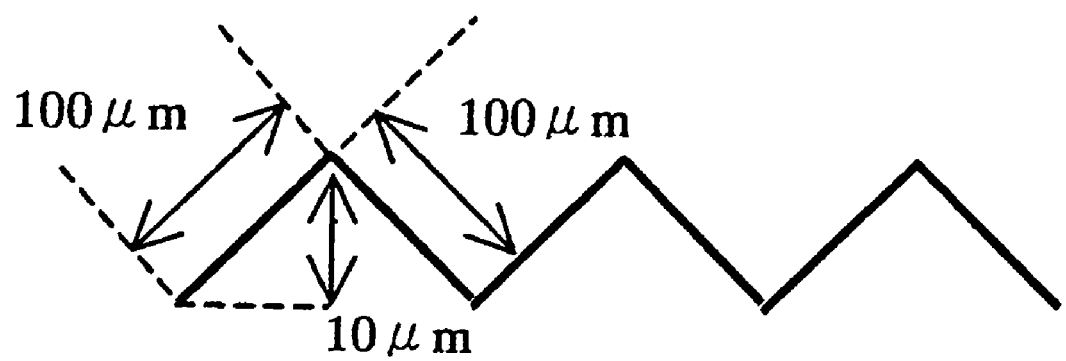

based on 100 parts by weight of polycarbonate resin.

There can be provided an optical disk substrate formed from the resin composition of the present invention, particularly an optical disk substrate which allows the shape of a stamper to be transferred thereon with high precision and hardly undergoes warpage caused by environmental changes as a high density recording medium, and a light guide plate which has little uneven brightness and hardly undergoes warpage.

23 Claims, 1 Drawing Sheet

OPTICAL DISK SUBSTRATE AND LIGHTGUIDE PLATE

TECHNICAL FIELD

The present invention relates to a polycarbonate resin composition having precise transferability to the shape of a stamper, high rigidity, low water absorbability and transparency and to an optical disk substrate and an optical disk which are obtained from the composition. More specifically, it relates to an optical disk substrate and an optical disk such as CD (Compact Disk), MD (Magnet-Optical Disk) and DVD (Digital Versatile Disk) which have precise transferability and hardly undergo warpage caused by environmental changes. In particular, the present invention relates to a substrate for a high density optical disk having a very large recording capacity.

Further, the present invention relates to an light guide plate used in planar light equipment attached to a display such as a liquid crystal display.

BACKGROUND ART

The recording densities of optical disks have been increasing from 0.6 GB of CD to 4.7 GB of DVD. However, along with progress in information technology, the development of an optical disk market is remarkable, and the emergence of a high density optical disk capable of storing a larger amount of data is desired. For example, an optical disk with a recording density of 100 Gbit/inch$^2$ or higher which can accommodate to digital broadcasting is desired.

To increase the density of an optical disk, a distance between grooves or pits, i.e., a track pitch, is narrowed, thereby increasing a recording density in a track direction. For example, an increase in recording density from CD to DVD has been achieved by narrowing the track pitch from 1.6 μm to 0.74 μm.

An optical disk substrate is produced by injection-molding (injection-compression-molding) a thermoplastic resin. At that time, fine pits and projections formed in advance on a stamper attached to a mold and corresponding to recording/reproduction signals are transferred onto the surface of the substrate from the stamper. Thus, at the time of molding the substrate, transferring the pits and projections of the stamper with high precision, i.e., precise transferability, is important. Particularly, in molding a high density optical disk substrate, the precise transferability is very important.

For high density optical disks, it is important to comprise a substrate with high transferability. In addition to this, it is also important to undergo smaller warpage of a substrate and smaller warpage with respect to environmental changes than conventional optical disks, due to the following reason. That is, along with an increase in density, the wavelength of laser is made shorter and the NA of pickup lens is made higher, so that even very small warpage of a substrate results in a large coma aberration, thereby causing a focus error or a tracking error. Further, since the pickup lens and the substrate become closer to each other due to the increase in NA, it is important that the warpage of the substrate and the warpage caused by environmental changes are small, so as to prevent the lens and the substrate from making contact with each other.

Heretofore, a polycarbonate resin has been used as a material of substrates for optical disks such as CD (Compact Disk), MO (Magnetooptical Disk) and DVD (Digital Versatile Disk) due to its excellent transparency, heat resistance, mechanical properties and dimensional stability.

However, along with an increase in the recording densities of the optical disks, optical disk substrates made of the polycarbonate resin have been becoming unsatisfactory in view of precise transferability and warpage.

To meet demand for an improvement in transferability, a variety of studies have heretofore been made in terms of both molding techniques and material modification. As for the former, for example, it has been confirmed that a method of setting a cylinder temperature and a mold temperature at the time of substrate molding at high temperatures is effective. However, this method requires long cooling time in a mold because it is high temperature molding, thereby extending a molding cycle and resulting in low productivity. If molding is forcibly carried out in a high cycle, improper mold release occurs when a substrate is released from a mold, thereby resulting in deformed pits or grooves and lowering precision of transfer. As for the latter, for example, a method (JP-A 9-208684 (the term "JP-A" as used herein means an "unexamined published Japanese patent application") and JP-A 11-1551, for example) comprising incorporating a large amount of a low molecular weight compound in a polycarbonate resin so as to impart high flowability or a method (JP-A 11-269260, for example) comprising using a specific long chain alkyl phenol as a terminal blocking agent is proposed. However, in the method of increasing the content of the low molecular weight compound or the method of modifying terminal groups by the long chain alkyl phenol, deterioration in thermal stability is generally remarkable. Therefore, as a result of promoting thermal decomposition at the time of molding, the mechanical strength of a disk substrate is significantly degraded, so that the substrate is cracked by force which pushes the substrate out of a mold or the substrate is broken during handling of the optical disk substrate.

Further, to improve transfer of pits and projections to the surface of a polycarbonate resin and warpage, a resin composition containing a biphenyl compound or a terphenyl compound (particularly an orthoterphenyl compound or a metaterphenyl compound) in a given amount is proposed (JP-A 2000-239513). When this resin composition contains the biphenyl compound, the amount of deposits on a mold is large, resulting in low productivity, while when the composition contains the terphenyl compound, transferability is not improved to a fully satisfactory level.

Thus, the prior arts are intended to improve transferability by improving the flowability of the resin. However, they fail to provide practicable substrates at high efficiency.

Meanwhile, to meet demand for an improvement in warpage as well, a variety of studies have been made in terms of both molding techniques and material modification. As for the former, although warpage of a substrate can be kept small by finely controlling molding conditions, it is difficult to transfer the shape of a stamper precisely. As for the latter, it is known to be effective to use a rigid material having a high flexural or tensile modulus. Thus, for the purpose of improving the rigidity of a polycarbonate resin, a method of adding such additives as glass fibers and a filler has been attempted. However, although the above additives improve the rigidity of the polycarbonate resin, they are exposed to the surface, thereby degrading precision of transfer.

"Precise transferability" in the present invention refers to a characteristic that fine pits and projections formed on a stamper can be transferred precisely when an optical disk substrate is produced from a thermoplastic resin molding material by injection molding.

As for warpage with respect to environmental changes, JP-A 2000-11449 proposes "a disk-shaped data recording medium which comprises a substrate, a recording layer disposed on the substrate so as to record data signals and a transparent protective layer laminated on the recording layer and on which data signals are recorded/reproduced by light entering from the transparent protective layer side, the substrate comprising a resin core layer and a resin surface layer which is integrated with the core layer, has pits and projections corresponding to data signals of the recording layer side on one surface and has higher flowability than the core layer, the surface layer of the substrate being made of a resin having a water absorption of not higher than 0.3%", so as to inhibit deformation caused by absorption of water, and suggests a complex substrate configuration by coinjection molding or sandwich molding so as to solve the problem.

Meanwhile, a light guide plate is an optical member used in planar light equipment attached to various displays such as a liquid crystal display. In an edge light mode, the light guide plate serves to allow light from a light source to eject in a direction perpendicular to the injection direction. Further, on the surface of the light guide plate, fine pits and projections which reflect or refract light efficiently are formed. Since such a light guide plate serves as a light source of a display, the member must have high permeability so as to achieve high brightness and uneven brightness on the light emitting surface must be low so as to achieve a uniform outgoing light quantity.

In recent years, as the size and thickness of displays have been increasing and decreasing year by year, respectively, the light guide plate has also been shifted to a larger size and a smaller thickness. When the light guide plate is produced by an injection molding method, the distance between the gate and the end of flow becomes longer along with an increase in size, so that pressure does not work effectively at the end of the flow. Further, along with a decrease in thickness, the progression of solidification of a molten resin by cooling is accelerated, so that pressure does not work effectively at the end of flow as in the case of the increase in size. Thus, there occurs a problem that transferability of pits and projections at the end of the flow is poor.

Meanwhile, displays such as a liquid crystal display are increasingly used in the outdoor. In this case, light guide plates are warped by a change in humidity of surrounding, thereby causing uneven display or interference with other components.

DISCLOSURE OF THE INVENTION

A first object of the present invention is to provide a polycarbonate resin composition having precise transferability to the shape of a stamper, high rigidity, low water absorbability and transparency and an optical disk substrate and an optical disk which are obtained from the composition, have high transferability and are hardly warped, particularly a high density optical disk substrate.

A second object of the present invention is to provide a light guide plate which shows little uneven brightness, is hardly deformed by absorption of water during use and can be made larger and thinner in size.

Means for Solving the Problems

According to studies made by the present inventors, it has been found that the first object of the present invention is achieved by an optical disk substrate formed from a resin composition comprising 0.1 to 20 parts by weight of compound represented by the following formula (I):

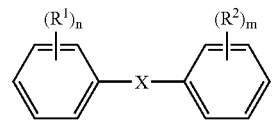

wherein X represents:

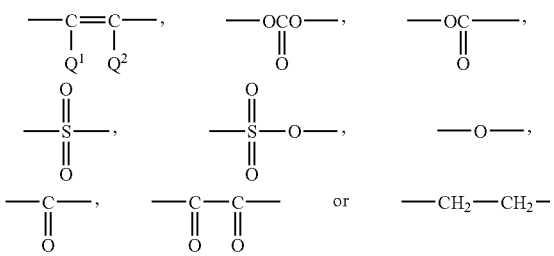

$R^1$ and $R^2$ independently represent a hydrogen atom, a halogen atom, an alkyl group or an alkoxy group having 1 to 8 carbon atoms, n and m independently represent an integer of 1 to 3, and $Q^1$ and $Q^2$ independently represent a hydrogen atom, a chlorine atom, a bromine atom, a cyano group or an alkyl group having 1 to 8 carbon atoms, based on 100 parts by weight of polycarbonate resin.

Further, according to the studies made by the present inventors, it has been found that the second object of the present invention is achieved by a light guide plate formed from a resin composition comprising 0.1 to 20 parts by weight of compound represented by the above formula (I) based on 100 parts by weight of polycarbonate resin.

The above optical disk substrate and light guide plate which are the objects of the present invention have fines pits and projections for optical recording or light scattering on surfaces thereof. By melt injection molding the resin composition of the present invention, molded articles having fine pits and projections on surfaces thereof can be obtained easily. In addition, the obtained molded articles have excellent physical properties and optical properties.

Hereinafter, the optical disk substrate and light guide plate of the present invention will be further described.

The optical disk substrate and light guide plate of the present invention use a polycarbonate resin as a resin. The polycarbonate resin is generally obtained by reacting a dihydric phenol with a carbonate precursor by an interfacial polymerization method or a melt polymerization method. Representative examples of the dihydric phenol include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (bisphenol A), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-3-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane,
2,2-bis(4-hydroxyphenyl)-3,3-dimethylbutane,
2,4-bis(4-hydroxyphenyl)-2-methylbutane,
2,2-bis(4-hydroxyphenyl)pentane,
1,1-bis(4-hydroxyphenyl)cyclohexane,
1,1-bis(4-hydroxyphenyl)-4-isopropyl cyclohexane,
1,1-bis(4-hydroxyphenyl)-3,3,5-trimethyl cyclohexane,
9,9-bis(4-hydroxyphenyl)fluorene,
9,9-bis{(4-hydroxy-3-methyl)phenyl}fluorene,
1,1'-bis(4-hydroxyphenyl)-ortho-diisopropyl benzene,
1,1'-bis(4-hydroxyphenyl)-meta-diisopropyl benzene,
1,1'-bis(4-hydroxyphenyl)-para-diisopropyl benzene,
1,3-bis(4-hydroxyphenyl)-5,7-dimethyl adamantane,
4,4'-dihydroxydiphenyl sulfone, 4,4'-dihydroxydiphenyl sulfoxide, 4,4'-dihydroxydiphenyl sulfide,
4,4'-dihydroxydiphenyl ketone, 4,4'-dihydroxydiphenyl ether, 4,4'-dihydroxydiphenyl ester,
1,1-bis(4-hydroxyphenyl)-2-methylpropane,
1,1-bis(4-hydroxyphenyl)-2-ethylhexane, and
2,2-bis(4-hydroxyphenyl)-2-methylpentane. These may be used alone or in combination of two or more.

Of these, 2,2-bis(4-hydroxyphenyl)propane (bisphenol A), 1,1-bis(4-hydroxyphenyl)-2-methylpropane and 2,2-bis(4-hydroxyphenyl)-4-methylpentane are preferred, and 2,2-bis(4-hydroxyphenyl)propane is particularly preferred.

Illustrative examples of the carbonate precursor used in producing the polycarbonate by use of the dihydric phenol include a carbonyl halide, a carbonate ester and a haloformate. Specific examples thereof include phosgene, diphenyl carbonate and dihaloformate of dihydric phenol. Of these, phosgene and diphenyl carbonate are preferred.

When the above dihydric phenol and carbonate precursor are reacted with each other by a method such as a solution polymerization method or a melt polymerization method so as to produce the polycarbonate resin, a catalyst, a terminal blocking agent and an antioxidant for the dihydric phenol may be used as required.

A reaction by the interfacial polymerization method is generally a reaction between a dihydric phenol and phosgene and is carried out in the presence of an acid binder and an organic solvent. As the acid binder, an alkali metal oxide such as sodium hydroxide or potassium hydroxide or an amine compound such as pyridine is used, for example. As the organic solvent, a halogenated hydrocarbon such as methylene chloride or chlorobenzene is used, for example. Further, a catalyst such as a tertiary amine, a quaternary ammonium compound or a quaternary phosphonium compound, e.g., triethylamine, tetra-n-butyl ammonium bromide and tetra-n-butyl phosphonium bromide, can be used so as to accelerate the reaction. In that case, it is preferable that the reaction temperature be generally 0 to 40° C., that the reaction time be about 10 minutes to 5 hours and that the pH during the reaction be kept at 9 or higher.

Further, in the polymerization reaction, a terminal blocking agent is generally used. As the terminal blocking agent, a monofunctional phenol can be used. The monofunctional phenol is generally used as a terminal blocking agent so as to control a molecular weight, and since a polycarbonate resin obtained by use of the monofunctional phenol has its terminals blocked by groups based on the monofunctional phenol, it has better thermal stability than a polycarbonate resin obtained without using the monofunctional phenol. An example of the monofunctional phenol is a monofunctional phenol which is generally phenol or a lower alkyl substituted phenol and is represented by the following formula [II]:

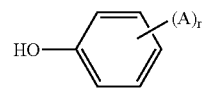

[wherein A is a hydrogen atom or a linear or branched alkyl or phenyl substituted alkyl group having 1 to 9 carbon atoms, and r is an integer of 1 to 5, preferably 1 to 3.]

Specific examples of the above monofunctional phenol include phenol, p-t-butyl phenol, p-cumyl phenol and isooctyl phenol.

Further, as other monofunctional phenols, phenols or benzoic acid chlorides having a long chain alkyl group or aliphatic ester group as a substituent or long chain alkyl carboxyl chlorides can be used. When they are used to block the terminals of a polycarbonate polymer, they not only act as a terminal blocking agent or a molecular weight modifier but also improve the melt flowability of the resin so as to facilitate moldability. In addition, they have an effect of lowering physical properties as a substrate, particularly the water absorption of the resin, and an effect of reducing the birefringence of the substrate. Hence, they are preferably used. In particular, phenols which have a long chain alkyl group as a substituent and are represented by the following formulae [III] and [IV] are preferably used.

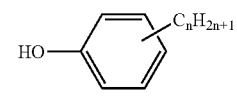

[In the above formulae, X is —R—CO—O— or —R—O—CO— wherein R is a single bond or a divalent aliphatic hydrocarbon group having 1 to 10, preferably 1 to 5 carbon atoms, and n is an integer of 10 to 50.]

As the substituted phenol of the above formula (III), a substituted phenol in which n is 10 to 30 is preferred, and a substituted phenol in which n is 10 to 26 is particularly preferred. Specific examples thereof include decyl phenol, dodecyl phenol, tetradecyl phenol, hexadecyl phenol, octadecyl phenol, eicosyl phenol, docosyl phenol and triacontyl phenol.

Further, as the substituted phenol of the above formula (IV), a compound in which X is —R—CO—O— and R is a single bond is appropriate, and a compound in which n is 10 to 30, particularly 10 to 26, is suitable. Specific examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

These terminal blocking agents are desirably introduced into at least 5 mol %, preferably at least 10 mol %, of all terminals of the obtained polycarbonate resin. Further, the terminal blocking agents may be used alone or in admixture of two or more.

A representative reaction by the melt polymerization method is generally an ester exchange reaction between a dihydric phenol and a carbonate ester and is carried out by a method in which the dihydric phenol and the carbonate ester are mixed together under heating in the presence of an inert gas and an alcohol or phenol produced is distilled out. Although the reaction temperature varies depending on the boiling point of the alcohol or phenol produced, it generally ranges from 120° C. to 350° C. In the late stage of the reaction, the reaction system is reduced to about 10 to 0.1 Torr (1,300 to 13 Pa) so as to facilitate distill-out of the alcohol or phenol produced. The reaction time is generally about 1 to 4 hours.

As the carbonate ester, an ester of an aryl group having 6 to 10 carbon atoms, aralkyl group or alkyl group having 1 to 4 carbon atoms which may have a substituent may be used. Specific examples thereof include diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate and dibutyl carbonate. Of these, diphenyl carbonate is preferred.

Further, to increase the polymerization rate, a polymerization catalyst can be used. As the polymerization catalyst, catalysts which are generally used in an esterification reaction and an ester exchange reaction, such as alkali metal compounds, e.g., sodium hydroxide, potassium hydroxide and sodium and potassium salts of dihydric phenol; alkaline earth metal compounds, e.g., calcium hydroxide, barium hydroxide and magnesium hydroxide; nitrogen-containing basic compounds, e.g., tetramethylammonium hydroxide, tetraethylammonium hydroxide, trimethylamine and triethylamine; alkoxides of alkali metals and alkaline earth metals; organic acid salts of alkali metals and alkaline earth metals; zinc compounds, boron compounds, aluminum compounds, silicon compounds, germanium compounds, organotin compounds, lead compounds, osmium compounds, antimony compounds, manganese compounds, titanium compounds and zirconium compounds can be used. These catalysts may be used alone or in combination of two or more. These polymerization catalysts preferably are used in an amount of $1 \times 10^{-8}$ to $1 \times 10^{-3}$ equivalents, more preferably $1 \times 10^{-7}$ to $5 \times 10^{-4}$ equivalents, per mole of the dihydric phenol which is a raw material.

Further, in the polymerization reaction, to reduce phenolic terminal groups, a compound such as bis(chlorophenyl) carbonate, bis(bromophenyl)carbonate, bis(nitrophenyl)carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate is preferably added in the late stage or after completion of the polycondensation reaction. Of these, 2-chlorophenylphenyl carbonate, 2-methoxycarbonylphenylphenyl carbonate and 2-ethoxycarbonylphenylphenyl carbonate are preferably used, and 2-methoxycarbonylphenylphenyl carbonate is particularly preferably used.

The viscosity average molecular weight of the polycarbonate resin is preferably within a range of 10,000 to 30,000, more preferably 12,000 to 20,000. A polycarbonate resin optical molding material having the viscosity average molecular weight is preferred since it has satisfactory strength as an optical material and has good melt flowability at the time of molding so that no molding distortion occurs. When the molecular weight is excessively low, the strength of a molded substrate is not satisfactory, while when it is excessively high, melt flowability at the time of molding is poor, and an undesirable optical distortion increases in the substrate.

After the polycarbonate resin as a raw material is produced by a conventionally known method (such as a solution polymerization method or a melt polymerization method), it is preferably filtered in a solution state so as to remove impurities such as unreacted components and foreign matter.

The resin composition constituting the optical disk substrate or the light guide plate in the present invention is produced by adding a specific amount of a compound (hereinafter may be abbreviated simply as "additive compound") represented by the following formula (I) to the above polycarbonate resin.

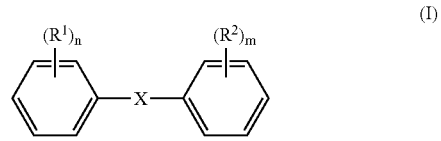

Next, this additive compound will be further described.

The additive compound of the present invention, as shown by the above formula (I), is a compound comprising two benzene rings bonded to each other via X which is a divalent group represented by the following formulae.

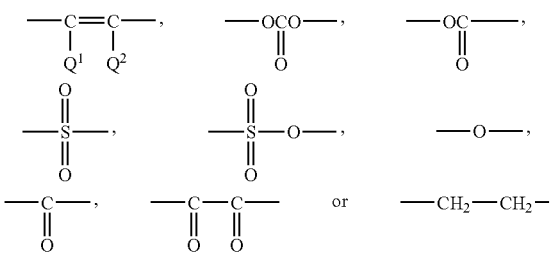

In the above formula (I), $R^1$ and $R^2$ each are a substituent or atom bonded to the benzene ring and independently represent a hydrogen atom, a halogen atom, an alkyl group or an alkoxy group having 1 to 8 carbon atoms, n and m independently represent an integer of 1 to 3, preferably 1, and $Q^1$ and $Q^2$ independently represent a hydrogen atom, a chlorine atom, a bromine atom, a cyano group or an alkyl group having 1 to 8 carbon atoms.

In the above formula (I), $R^1$ and $R^2$ are preferably a hydrogen atom, an alkyl group having 1 to 8 carbon atoms or an alkoxy group, particularly preferably a hydrogen atom or an alkyl group having 1 to 3 carbon atoms. Further, $Q^1$ and $Q^2$ are preferably a hydrogen atom or an alkyl group having 1 to 8 carbon atoms, particularly preferably a hydrogen atom or an alkyl group having 1 to 3 carbon atoms.

In the above formula (I), X is preferably one of the following groups.

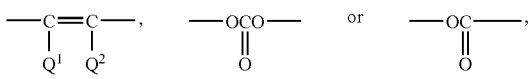

Compounds having the leftmost group, the middle group and the rightmost group are referred to as a stilbene compound, a diphenyl carbonate compound and a phenyl benzoate compound, respectively. Of these, the most preferable compound is the stilbene compound whose X is represented by the following formula.

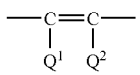

Specific examples of the stilbene compound include stilbene ($Q^1$ and $Q^2$ are a hydrogen atom) and 4,4'-dimethyl stilbene ($R^1$ and $R^2$ are a methyl group).

Of the above additive compounds, a resin composition containing the stilbene compound whose X is represented by the following formula:

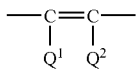

has advantages that it has excellent transferability and that a molded article obtained from the composition has a very good flexural modulus and very low water absorption.

Meanwhile, a resin composition containing the diphenyl carbonate compound whose X is a carbonate bond or the phenyl benzoate compound whose X is an ester bond has improved transferability, and a molded article obtained from the composition has balanced properties as a whole, as exemplified by a good flexural modulus and low water absorption.

A resin composition containing a diphenyl ether compound whose X is —O— has excellent transferability, and a molded article obtained from the composition shows low water absorption and a slightly improved flexural modulus. A resin composition containing a diphenyl sulfone compound or phenylsulfonic acid phenyl ester compound whose X is

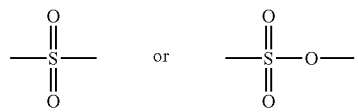

has slightly improved transferability, and a molded article obtained from the composition has improved heat resistance and an improved flexural modulus.

A resin composition containing a benzophenone compound or benzyl compound whose X is —CO— or

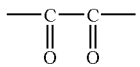

has very good transferability but it also has a low glass transition point. Further, a molded article obtained from the composition has improved water absorption and an improved flexural modulus.

The resin composition of the present invention contains the additive compound represented by the above formula (I) in an amount of 0.1 to 20 parts by weight, preferably 0.5 to 10 parts by weight, based on 100 parts by weight of the polycarbonate resin. The resin composition most preferably contains the additive compound in an amount of 1 to 8 parts by weight.

The resin composition of the present invention is prepared by use of any method. For example, a method which comprises mixing the above additive compound into the polycarbonate resin in a solution state, distilling out a solvent and then melt-pelletizing the resulting mixture by a vented extruder or the like or a method comprising mixing the polycarbonate resin with the above additive compound by use of a super mixer, a tumbler, a Nauta mixer or the like and pelletizing the mixture by use of a twin screw extruder or the like. Further, if necessary, additives such as a stabilizer, an antioxidant, a light stabilizer, a colorant, a lubricant and a mold release agent can be added. Further, in the extrusion step (pelletizing step) of obtaining a pellet-shaped polycarbonate resin composition to be injection-molded, the composition is preferably passed through a sintered metal filter having a filtration accuracy of 10 μm during melt stage so as to remove foreign matter therefrom. If necessary, an additive such as a phosphorus based antioxidant is preferably added. In any event, it is necessary to minimize the contents of foreign matter, impurities and solvents in the raw material resin composition before injection molding.

To produce an optical disk substrate from the above polycarbonate resin composition, an injection molding machine (including an injection compression molding machine) is employed. As the injection molding machine, a generally used machine may be used. However, an injection molding machine whose cylinder and screws show low adhesion to the resin and which is made of a material showing corrosion resistance and abrasion resistance is preferably used so as to inhibit the occurrence of carbides and to increase the reliability of the disk substrate. As for conditions for injection molding, a cylinder temperature of 300 to 400° C. and a mold temperature of 50 to 140° C. are preferred. By these conditions, an optically excellent optical disk substrate can be obtained. The atmosphere in the molding step is preferably as clean as possible in consideration of the objects of the present invention. Further, it is important to fully dry the material to be molded so as to remove water therefrom and also important to be careful not to allow retention which may cause decomposition of the molten resin.

The thus molded optical disk substrate is suitably used as a substrate not only for current optical disks such as a compact disk (CD), a magnetooptical disk (MO) and DVD but also for high density optical disks as typified by a Blu-ray Disc (BD) on which recording and reproduction are conducted via a 0.1-mm-thick transparent cover layer placed on the disk substrate.

Since the polycarbonate resin optical molding material of the present invention has high precision transferability, an optical disk substrate having a distance between grooves or pits of 0.1 to 0.8 μm, preferably 0.1 to 0.5 μm, more preferably 0.1 to 0.35 μm, can be obtained easily by molding. Further, an optical disk substrate whose groove or pit has an optical depth of λ/8n to λ/2n, preferably λ/6n to λ/2n, more preferably λ/4n to λ/2n wherein λ is the wavelength of laser light used for recording and reproduction and n is the refractive index of the substrate can be obtained. Thus, a substrate for a high density optical disk recording medium having a recording density of 100 Gbit/inch$^2$ or higher can be provided easily.

When a light guide plate is produced from the polycarbonate resin composition of the present invention, a method comprising molding the composition into a flat plate by a known extrusion method or flow casting method and then forming pits and projections on a surface of the plate or a method comprising producing the light guide plate by an injection molding method by use of a mold having a cavity in which pits and projections are formed can be used. In particular, the injection molding method is preferred from the viewpoint of productivity.

A molding machine used in the injection molding method may be a generally used molding machine. However, a molding machine whose cylinder and screws show low adhesion to the resin and which is made of a material showing corrosion resistance and abrasion resistance is preferably used so as to inhibit the occurrence of carbides and to increase the reliability of the light guide plate. The atmosphere in the molding step is preferably as clean as possible in consideration of the objects of the present invention. Further, it is important to fully dry the material to be molded so as to remove water therefrom and also important to be careful not to allow retention which may cause decomposition of the molten resin.

The thus molded light guide plate is suitably used as a light guide plate not only for small displays such as a liquid crystal display for a potable telephone but also for large liquid crystal displays of 14 inches or larger.

BRIEF DESCRIPTION OF THE INVENTION

FIG. 1 shows the sizes and shapes in a cross section of pits and projections on the surface of a light guide plate.

EXAMPLES

Hereinafter, the present invention will be further described with reference to Examples. The present invention shall not be limited by these Examples in any way as long as the spirit of the present invention is upheld. "Parts" in Examples and Comparative Examples refers to parts by weight. Evaluations were made in accordance with the following methods.

(1) Viscosity Average Molecular Weight

A specific viscosity ($\eta$sp) obtained by use of a 20° C. solution prepared by dissolving 0.7 g of polycarbonate resin in 100 mL of methylene chloride is substituted into the following expression so as to determine a viscosity average molecular weight.

$\eta sp/c=[\eta]+0.45\times[\eta]^2 c$ ([$\eta$] is a limiting viscosity.)

$[\eta]=1.23\times10^{-4}M^{0.83}$ c=0.7

(2) Glass Transition Temperature

A glass transition temperature is measured in a nitrogen atmosphere (nitrogen flow rate: 40 ml/min) at a temperature increasing rate of 20° C./min by use of the thermal analysis system DSC-2910 of TA Instruments Co., Ltd.

(3) Water Absorption

In accordance with ASTM D-570, a $\phi$45-mm molded plate is immersed in water, and water absorption is determined from a rate of change in weight (% by weight).

(4) Flexural Modulus

A flexural modulus is measured in accordance with ASTM D-790.

(5) Transferability

An optical disk substrate having a diameter of 120 mm and a thickness of 1.2 mm is molded by use of the injection molding machine MO40D-3H of Nissei Plastic Industrial Co., Ltd. and a stamper on which grooves each having a depth of 200 nm and a width of 0.2 µm are engraved at an interval of 0.5 µm. The cylinder temperature and the mold clamping force are fixed at 360° C. and 40 tons, respectively, and the mold temperature is set for each resin as shown in Table 1.

The depths of grooves transferred from the stamper onto the above substrate are measured on 5 spots on a radius of 40 mm by use of an atomic force microscope (SPI3700 of Seiko Instruments Inc.). Transferability is expressed as a transfer rate represented by the following expression. The larger the value, the better the transferability is transfer rate (%)=100×(depth of groove of disk)/(depth of groove of stamper).

(6) Initial Mechanical Property (Initial R-Tilt)

An optical disk substrate having a diameter of 120 mm and a thickness of 1.2 mm is molded by use of the injection molding machine MO40D-3H of Nissei Plastic Industrial Co., Ltd. Then, on the signal surface side of the disk substrate obtained by injection molding, a reflection film, a dielectric layer 1, a phase change recording film and a dielectric layer 2 are deposited by sputtering, and a thin polycarbonate film cover layer is laminated thereon so as to prepare an optical disk. Then, a spacer is inserted between the disks so as to prevent the disks from contacting each other, and the disks are left to stand at a temperature of 23° C. and a humidity of 50% RH for at least two days. Tilt is evaluated by use of the three-dimensional shape measuring instrument DLD-3000U of Japan EM Co., Ltd. when a change in the Tilt with respect to thermal contraction and environmental changes is settled, and the Tilt is taken as an initial mechanical property.

(7) Maximum Value of Curvature Deformation ($\Delta$R-Tilt-max)

After a substrate whose initial mechanical property has been evaluated is left to stand in constant-temperature constant-humidity equipment whose temperature is 30° C. and humidity is 90% RH for 72 hours, the disk is transferred to an environment whose temperature is 23° C. and humidity is 50% RH, and the maximum value ($\Delta$R-Tiltmax) of curvature deformation of the disk is then evaluated by the three-dimensional shape measuring instrument DLD-3000U of Japan EM Co., Ltd.

(8) Test for Measuring Quantity of Deposits 3,000 optical disk substrates each having a diameter of 120 mm and a thickness of 1.2 mm are molded continuously by use of the injection molding machine MO40D-3H of Nissei Plastic Industrial Co., Ltd. and a stamper on which grooves each having a depth of 200 nm and a width of 0.2 µm are engraved at an interval of 0.5 µm. After continuous molding of the 3,000 substrates, deposits on the stamper after molding are extracted by chloroform and dried, and the quantity of the deposits is measured.

The quantity of the deposits is evaluated based on the following criteria.

A: The quantity of deposits after molding of 3,000 substrates is 1 to 10 mg.

B: The quantity of deposits after molding of 3,000 substrates is 11 to 20 mg.

C: The quantity of deposits after molding of 3,000 substrates is 21 mg or higher.

D: Deposits are transferred to substrates before molding of 3,000 substrates is completed.

(9) Uneven Brightness

On a white reflective resin plate having a size of 150 mm×150 mm and a thickness of 2 mm, a test piece having a size of 150 mm×150 mm and a thickness of 4 mm is placed. On one side of the test piece, a cold cathode tube having a diameter of 2.6 mm and a length of 170 mm is disposed, and brightness (cd/m²) on 9 spots which are adequately scattered on the test piece is measured by the color brightness photometer BM-7 of Topcon Corporation. Uneven brightness is determined from the maximum brightness and the minimum brightness out of the measurement results by use of the following expression.

Uneven Brightness (%)=(Minimum/Maximum)×100 machine MO40D-3H of Nissei Plastic Industrial Co., Ltd. and a stamper on which grooves each having a depth of 200 nm and a width of 0.2 μm were engraved at an interval of 0.5 μm. The cylinder temperature and the mold clamping force were fixed at 360° C. and 40 tons, respectively, and the mold temperature was set for each resin as shown in Table 1. By use of these disk substrates, various substrate properties were evaluated by the above methods. The results of the evaluations are shown in Table 1. Stilbene compounds shown in Table 1 are as follows.

stilbene: trans-stilbene of Tokyo Kasei Kogyo Co., Ltd. 4,4 dimethyl stilbene: 4,4-dimethyl-trans-stilbene of Tokyo Kasei Kogyo Co., Ltd.

TABLE 1

|  | Ex. A-1 | Ex. A-2 | Ex. A-3 | C. Ex. 1 | C. Ex. 2 | C. Ex. 3 | C. Ex. 4 |
|---|---|---|---|---|---|---|---|
| Kind of Additive | Stilbene | Stilbene | 4,4 dimethyl stilbene | — | Glass Fibers | m-terphenyl | Biphenyl |
| Added Amount (wt %) | 2 | 5 | 5 | 0 | 10 | 5 | 5 |
| Glass Transition Temperature Tg (° C.) | 126 | 114 | 110 | 142 | 142 | 119 | 124 |
| Water Absorption (%) | 0.22 | 0.19 | 0.20 | 0.32 | 0.32 | 0.20 | 0.23 |
| Flexural Modulus (MPa) | 2,800 | 3,000 | 3,100 | 2,300 | 3,700 | 2,810 | 2,810 |
| Mold Temperature $Tm_0$ (° C.) | 109 | 97 | 93 | 125 | 125 | 102 | 107 |
| $\Delta T$(° C.)* | 17 | 17 | 17 | 17 | 17 | 17 | 17 |
| Initial R-Tilt (deg) | 0.08 | 0.07 | 0.07 | 0.09 | 0.28 | 0.07 | 0.07 |
| $\Delta$R-Tilt max (deg) | 0.69 | 0.52 | 0.53 | 0.92 | 0.95 | 0.59 | 0.75 |
| Transfer Rate (%) | 100 | 100 | 100 | 54 | 12 | 62 | 100 |
| Total Light Transmittance (%) | 91 | 91 | 91 | — | — | 91 | 91 |
| Amount of Deposit on Mold | A | B | B | — | — | B | D |

Ex.: Example,
C. Ex.: Comparative Example
*$\Delta T$ = difference between glass transition temperature and mold temperature = $Tg - Tm_0$ In this case, an uneven brightness of 100% implies no uneven brightness and is optimal brightness.

(10) Curvature Deformation by Absorption of Water

After a test piece whose initial curvature deformation has been measured is left to stand in constant-temperature constant-humidity equipment whose temperature is 50° C. and humidity is 80% RH for 7 days, the test piece is transferred to an environment whose temperature is 23° C. and humidity is 50% RH, and the maximum value of curvature deformation thereof is then evaluated by use of a three-dimensional shape measuring instrument.

Examples A-1 to A-3 and Comparative Examples 1 to 4

To 100 parts by weight of polycarbonate resin (product of Teijin Chemicals Ltd.) obtained by use of bisphenol A as a dihydric phenol component and having a viscosity average molecular weight of 15,200, additive compounds were added in parts by weight shown in Table 1 and mixed uniformly. Then, the powders were melt-kneaded by a vented twin-screw extruder [KTX-46 of Kobe Steel, Ltd.] at a cylinder temperature of 260° C. under deaeration so as to obtain pellets of the resin compositions. Using the resin composition pellets, various physical properties were evaluated by the above methods. The results of the evaluations are shown in Table 1.

From these resin composition pellets, optical disk substrates each having a diameter of 120 mm and a thickness of 1.2 mm were molded by use of the injection molding machine MO40D-3H of Nissei Plastic Industrial Co., Ltd. and a stamper on which grooves each having a depth of 200 nm and a width of 0.2 μm were engraved at an interval of 0.5 m. The cylinder temperature and the mold clamping force were fixed at 360° C. and 40 tons, respectively, and the mold temperature was set for each resin as shown in Table 1. By use of these disk substrates, various substrate properties were evaluated by the above methods. The results of the evaluations are shown in Table 1.

Examples B-1 to B-3

To 100 parts by weight of polycarbonate resin (product of Teijin Chemicals Ltd.) obtained by use of bisphenol A as a dihydric phenol component and having a viscosity average molecular weight of 15,200, additive compounds were added in parts by weight shown in Table 2 and mixed uniformly. Then, the powders were melt-kneaded by a vented twin-screw extruder [KTX-46 of Kobe Steel, Ltd.] at a cylinder temperature of 260° C. under deaeration so as to obtain pellets of the resin compositions. Using the resin composition pellets, various physical properties were evaluated by the above methods. The results of the evaluations are shown in Table 2.

From these resin composition pellets, optical disk substrates each having a diameter of 120 mm and a thickness of 1.2 mm were molded by use of the injection molding machine MO40D-3H of Nissei Plastic Industrial Co., Ltd. and a stamper on which grooves each having a depth of 200 nm and a width of 0.2 μm were engraved at an interval of 0.5 m. The cylinder temperature and the mold clamping force were fixed at 360° C. and 40 tons, respectively, and the mold temperature was set for each resin as shown in Table 2. By use of these disk substrates, various substrate properties were evaluated by the above methods. The results of the evaluations are shown in Table 2. A diphenyl carbonate compound and/or a phenyl benzoate compound shown in Table 2 are as follows.

diphenyl carbonate: product of Teijin Chemicals Ltd.
phenyl benzoate: product of Teijin Chemicals Ltd.

TABLE 2

|  | Ex. B-1 | Ex. B-2 | Ex. B-3 |
|---|---|---|---|
| Kind of Additive Compound | Diphenyl Carbonate | Diphenyl Carbonate | Phenyl Benzoate |
| Added Amount [wt %] | 2 | 5 | 5 |
| Glass Transition Temperature Tg [° C.] | 134 | 125 | 128 |
| Water Absorption [%] | 0.23 | 0.19 | 0.20 |
| Flexural Modulus [MPa] | 2,610 | 2,890 | 2,870 |
| Total Light Transmittance [%] | 91 | 91 | 90 |
| Mold Temperature $Tm_0$ [° C.] | 117 | 108 | 111 |
| $\Delta T$(° C.)* | 17 | 17 | 17 |
| Initial T-Tilt [deg] | 0.09 | 0.06 | 0.06 |
| $\Delta$T-Tilt [deg] | 0.67 | 0.53 | 0.55 |
| Transfer Rate [%] | 100 | 100 | 100 |
| Amount of Deposit on Mold | A | B | B |

Ex.: Example
*$\Delta T$ = difference between glass transition temperature and mold temperature = $Tg - Tm_0$

Examples C-1 to C-3

To 100 parts by weight of polycarbonate resin (product of Teijin Chemicals Ltd.) obtained by use of bisphenol A as a dihydric phenol component and having a viscosity average molecular weight of 15,200, additive compounds were added in parts by weight shown in Table 3 and mixed uniformly. Then, the powders were melt-kneaded by a vented twin-screw extruder [KTX-46 of Kobe Steel, Ltd.] at a cylinder temperature of 260° C. under deaeration so as to obtain pellets of the resin compositions. Using the resin composition pellets, various physical properties were evaluated by the above methods. The results of the evaluations are shown in Table 3.

From these resin composition pellets, optical disk substrates each having a diameter of 120 mm and a thickness of 1.2 mm were molded by use of the injection molding machine MO40D-3H of Nissei Plastic Industrial Co., Ltd. and a stamper on which grooves each having a depth of 200 nm and a width of 0.2 μm were engraved at an interval of 0.5 μm. The cylinder temperature and the mold clamping force were fixed at 360° C. and 40 tons, respectively, and the mold temperature was set for each resin as shown in Table 3. By use of these disk substrates, various substrate properties were evaluated by the above methods. The results of the evaluations are shown in Table 3. Diphenyl sulfone compounds and/or phenyl sulfonic acid phenyl ester shown in Table 3 are as follows.

diphenyl sulfone: diphenyl sulfone of Tokyo Kasei Kogyo Co., Ltd.
difluorodiphenyl sulfone: 4,4-difluorodiphenyl sulfone of Tokyo Kasei Kogyo Co., Ltd.
phenyl sulfonic acid phenyl ester: phenyl sulfonic acid phenyl ester of Tokyo Kasei Kogyo Co., Ltd.

TABLE 3

|  | Ex. C-1 | Ex. C-2 | Ex. C-3 |
|---|---|---|---|
| Kind of Additive Compound | Diphenyl Sulfone | Difluorodiphenyl Sulfone | Phenyl Sulfonic Acid Phenyl Ester |
| Added Amount (wt %) | 5 | 5 | 5 |
| Glass Transition Temperature Tg (° C.) | 127 | 124 | 118 |
| Water Absorption (%) | 0.20 | 0.19 | 0.22 |
| Flexural Modulus (MPa) | 3,000 | 3,100 | 2,850 |
| Total Light Transmittance (%) | 91 | 91 | 90 |
| Mold Temperature $Tm_0$ (° C.) | 110 | 107 | 101 |
| $\Delta T$(° C.)* | 17 | 17 | 17 |
| Initial R-Tilt (deg) | 0.08 | 0.06 | 0.07 |
| $\Delta$R-Tilt (deg) | 0.59 | 0.54 | 0.63 |
| Transfer Rate (%) | 100 | 100 | 100 |
| Amount of Deposit on Mold | A | A | A |

Ex.: Example
*$\Delta T$ = difference between glass transition temperature and mold temperature = $Tg - Tm_0$

Examples D-1 to D-3

To 100 parts by weight of polycarbonate resin (product of Teijin Chemicals Ltd.) obtained by use of bisphenol A as a dihydric phenol component and having a viscosity average molecular weight of 15,200, additive compounds were added in parts by weight shown in Table 4 and mixed uniformly. Then, the powders were melt-kneaded by a vented twin-screw extruder [KTX-46 of Kobe Steel, Ltd.] at a cylinder temperature of 260° C. under deaeration so as to obtain pellets of the resin compositions. Using the resin composition pellets, various physical properties were evaluated by the above methods. The results of the evaluations are shown in Table 4.

From these resin composition pellets, optical disk substrates each having a diameter of 120 mm and a thickness of 1.2 mm were molded by use of the injection molding machine MO40D-3H of Nissei Plastic Industrial Co., Ltd. and a stamper on which grooves each having a depth of 200 nm and a width of 0.2 μm were engraved at an interval of 0.5 μm. The cylinder temperature and the mold clamping force were fixed at 360° C. and 40 tons, respectively, and the mold temperature was set for each resin as shown in Table 4. By use of these disk substrates, various substrate properties were evaluated by the above methods. The results of the evaluations are shown in Table 4. Diphenyl ether compounds shown in Table 4 are as follows.

diphenyl ether: product of Wako Pure Chemical Industries, Ltd.
dimethoxydiphenyl ether: product of Teijin Chemicals Ltd.

TABLE 4

|  | Ex. D-1 | Ex. D-2 | Ex. D-3 |
|---|---|---|---|
| Kind of Additive Compound | Diphenyl Ether | Diphenyl Ether | Dimethoxydiphenyl Ether |
| Added Amount [wt %] | 2 | 5 | 5 |
| Glass Transition Temperature Tg [° C.] | 135 | 127 | 130 |
| Water Absorption [%] | 0.20 | 0.17 | 0.15 |
| Flexural Modulus [MPa] | 2,700 | 3,100 | 3,400 |
| Total Light Transmittance [%] | 91 | 91 | 90 |
| Mold Temperature $Tm_0$ [° C.] | 118 | 110 | 113 |
| $\Delta T$(° C.)* | 17 | 17 | 17 |
| Initial T-Tilt [deg] | 0.09 | 0.06 | 0.06 |
| $\Delta$T-Tilt [deg] | 0.63 | 0.48 | 0.50 |
| Transfer Rate [%] | 100 | 100 | 100 |

TABLE 4-continued

|  | Ex. D-1 | Ex. D-2 | Ex. D-3 |
|---|---|---|---|
| Amount of Deposit on Mold | C | C | C |

Ex.: Example
*$\Delta T$ = difference between glass transition temperature and mold temperature = $Tg - Tm_0$

Examples E-1 to E-4

To 100 parts by weight of polycarbonate resin (product of Teijin Chemicals Ltd.) obtained by use of bisphenol A as a dihydric phenol component and having a viscosity average molecular weight of 15,200, additive compounds were added in parts by weight shown in Table 5 and mixed uniformly. Then, the powders were melt-kneaded by a vented twin-screw extruder [KTX-46 of Kobe Steel, Ltd.] at a cylinder temperature of 260° C. under deaeration so as to obtain pellets of the resin compositions. Using the resin composition pellets, various physical properties were evaluated by the above methods. The results of the evaluations are shown in Table 5.

From these resin composition pellets, optical disk substrates each having a diameter of 120 mm and a thickness of 1.2 mm were molded by use of the injection molding machine MO40D-3H of Nissei Plastic Industrial Co., Ltd. and a stamper on which grooves each having a depth of 200 nm and a width of 0.2 μm were engraved at an interval of 0.5 μm. The cylinder temperature and the mold clamping force were fixed at 360° C. and 40 tons, respectively, and the mold temperature was set for each resin as shown in Table 5. By use of these disk substrates, various substrate properties were evaluated by the above methods. The results of the evaluations are shown in Table 5. A benzophenone compound, diphenylethane dione compound or dibenzyl compound shown in Table 5 is as follows.

benzophenone: benzophenone of Wako Pure Chemical Industries, Ltd.
diphenylethane dione: diphenylethane dione (benzyl) of Wako Pure Chemical Industries, Ltd.
dibenzyl: dibenzyl of Tokyo Kasei Kogyo Co., Ltd.

Examples F-1 to F-9 and Comparative Examples 5 to 7

To 100 parts by weight of polycarbonate resin (product of Teijin Chemicals Ltd.) obtained by use of bisphenol A as a dihydric phenol component and having a viscosity average molecular weight of 15,200, additive compounds shown in Table 6 were added in an amount of 5 parts by weight, and they were mixed uniformly. Then, the powders were melt-kneaded by a vented twin-screw extruder [KTX-46 of Kobe Steel, Ltd.] at a cylinder temperature of 260° C. under deaeration so as to obtain pellets of the resin compositions.

From these resin composition pellets, light guide plate test pieces each having a size of 150 mm×150 mm and a thickness of 4 mm were molded by use of the injection molding machine IS-150EN of TOSHIBA MACHINE CO., LTD. and a mold having pits and projections shown in FIG. 1 in a cavity. The cylinder temperature was set at 320° C., and the mold temperature was set for each resin as shown in Table 6. By use of these test pieces, various properties as light guide plates were evaluated. The results of the evaluations are shown in Table 6.

TABLE 6

| No. | Name of Additive Compound | Mold Temperature (° C.) | Uneven Brightness (%) | Curvature Deformation by Water Absorption (mm) |
|---|---|---|---|---|
| Ex. F-1 | Stilbene | 97 | 89 | 1.33 |
| Ex. F-2 | Diphenyl Carbonate | 108 | 88 | 1.40 |
| Ex. F-3 | Phenyl Benzoate | 111 | 88 | 1.40 |
| Ex. F-4 | Diphenyl Sulfone | 110 | 87 | 1.52 |
| Ex. F-5 | Phenyl Sulfonic Acid Phenyl Ester | 101 | 87 | 1.67 |
| Ex. F-6 | Diphenyl Ether | 110 | 86 | 1.29 |
| Ex. F-7 | Benzophenone | 111 | 88 | 1.49 |
| Ex. F-8 | Diphenylethane Dione | 111 | 88 | 1.52 |
| Ex. F-9 | Dibenzyl | 98 | 88 | 1.32 |
| C. Ex. 5 | — | 125 | 39 | 2.54 |
| C. Ex. 6 | m-terphenyl | 102 | 41 | 1.59 |
| C. Ex. 7 | Biphenyl | 107 | 88 | 2.02 |

Ex.: Example,
C. Ex.: Comparative Example

TABLE 5

|  | Ex. E-1 | Ex. E-2 | Ex. E-3 | Ex. E-4 |
|---|---|---|---|---|
| Kind of Additive Compound | Benzophenone | Benzophenone | Diphenylethane Dione | Dibenzyl |
| Added Amount [wt %] | 2 | 5 | 5 | 5 |
| Glass Transition Temperature Tg [° C.] | 134 | 128 | 128 | 115 |
| Water Absorption [%] | 0.24 | 0.20 | 0.21 | 0.19 |
| Flexural Modulus [MPa] | 2,630 | 2,940 | 2,970 | 3,030 |
| Total Light Transmittance [%] | 91 | 91 | 90 | 90 |
| Mold Temperature $Tm_0$ [° C.] | 117 | 111 | 111 | 98 |
| $\Delta T$(° C.)* | 17 | 17 | 17 | 17 |
| Initial T-Tilt [deg] | 0.10 | 0.07 | 0.08 | 0.07 |
| $\Delta T$-Tilt [deg] | 0.72 | 0.58 | 0.60 | 0.51 |
| Transfer Rate [%] | 100 | 100 | 100 | 100 |
| Amount of Deposit on Mold | B | B | B | C |

Ex.: Example
*$\Delta T$ = difference between glass transition temperature and mold temperature = $Tg - Tm_0$ According to the present invention, there can be provided an optical recording medium molded from a polycarbonate resin composition containing a specific additive compound, particularly an optical disk substrate which allows the shape of a stamper to be transferred thereon with high precision and hardly undergoes warpage caused by environmental changes as a high density recording medium, and a light guide plate which has little uneven brightness and hardly undergoes warpage.

We claim:

1. An optical disk substrate which comprises a polycarbonate resin composition comprising 0.1 to 20 parts by weight of compound represented by the following formula (I):

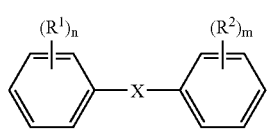

wherein X represents:

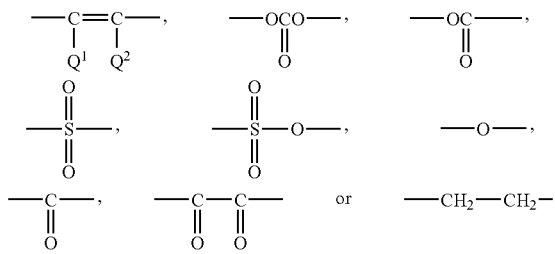

$R^1$ and $R^2$ independently represent a hydrogen atom, a halogen atom, an alkyl group or an alkoxy group having 1 to 8 carbon atoms, n and m independently represent an integer of 1 to 3, and $Q^1$ and $Q^2$ independently represent a hydrogen atom, a chlorine atom, a bromine atom, a cyano group or an alkyl group having 1 to 8 carbon atoms, based on 100 parts by weight of polycarbonate resin.

2. The substrate of claim 1, wherein the compound represented by the formula (I) is a compound wherein X is represented by one of the following formulae:

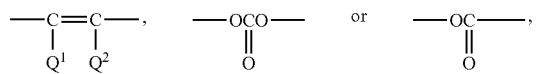

(wherein $Q^1$ and $Q^2$ are the same as defined above.)

3. The substrate of claim 1, wherein the compound represented by the formula (I) is a compound wherein X is represented by the following formula:

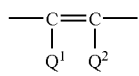

(wherein $Q^1$ and $Q^2$ are the same as defined above.)

4. The substrate of claim 1, wherein the resin composition comprises the compound represented by the formula (I) in an amount of 0.5 to 10 parts by weight based on 100 parts by weight of the polycarbonate resin.

5. The substrate of claim 1, wherein the polycarbonate resin is a polycarbonate resin having a viscosity average molecular weight of 10,000 to 30,000.

6. The substrate of claim 1, wherein the polycarbonate resin is a polycarbonate resin obtained by use of 2,2-bis(4-hydroxyphenyl)propane as a dihydric phenol component.

7. The substrate of claim 1, wherein grooves and pits are provided thereon and the distance between said grooves or pits is 0.1 to 0.8 μm.

8. The substrate of claim 1, wherein the optical depth of a groove or pit is λ/8n to λ/2n, when the wavelength of laser light used for recording and reproduction is λ and the refractive index of the substrate is n.

9. An optical recording medium having a recording surface formed on the uneven surface of the optical disk substrate of claim 1.

10. A light guide plate which comprises a polycarbonate resin composition comprising 0.1 to 20 parts by weight of compound represented by the following formula (I):

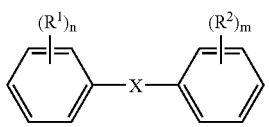

wherein X represents:

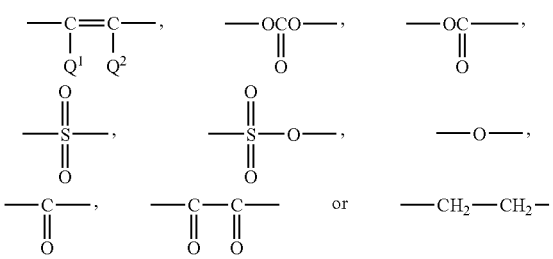

$R^1$ and $R^2$ independently represent a hydrogen atom, a halogen atom, an alkyl group or an alkoxy group having 1 to 8 carbon atoms, n and m independently represent an integer of 1 to 3, and $Q^1$ and $Q^2$ independently represent a hydrogen atom, a chlorine atom, a bromine atom, a cyano group or an alkyl group having 1 to 8 carbon atoms, based on 100 parts by weight of polycarbonate resin.

11. The light guide plate of claim 10, wherein the compound represented by the formula (I) is a compound wherein X is represented by one of the following formulae:

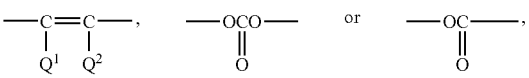

(wherein $Q^1$ and $Q^2$ are the same as defined above.)

12. The light guide plate of claim 10, wherein the compound represented by the formula (I) is a compound wherein X is represented by the following formula:

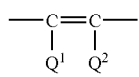

(wherein $Q^1$ and $Q^2$ are the same as defined above.)

13. The light guide plate of claim 10, wherein the resin composition comprises the compound represented by the formula (I) in an amount of 0.5 to 10 parts by weight based on 100 parts by weight of the polycarbonate resin.

14. The light guide plate of claim 10, wherein the polycarbonate resin is a polycarbonate resin having a viscosity average molecular weight of 10,000 to 30,000.

15. The light guide plate of claim 10, wherein the polycarbonate resin is a polycarbonate resin obtained by use of 2,2-bis(4-hydroxyphenyl)propane as a dihydric phenol component.

16. A liquid crystal display having the light guide plate of claim 10 as a backlight source.

17. A polycarbonate resin composition comprising 0.1 to 20 parts by weight of compound represented by the following formula (I):

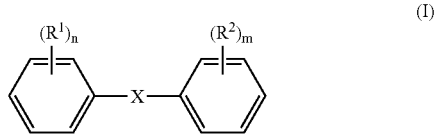

wherein X represents:

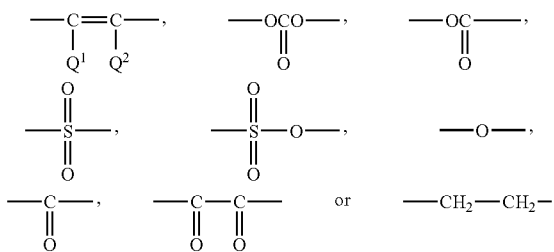

$R^1$ and $R^2$ independently represent a hydrogen atom, a halogen atom, an alkyl group or an alkoxy group having 1 to 8 carbon atoms, n and m independently represent an integer of 1 to 3, and $Q^1$ and $Q^2$ independently represent a hydrogen atom, a chlorine atom, a bromine atom, a cyano group or an alkyl group having 1 to 8 carbon atoms, based on 100 parts by weight of polycarbonate resin.

18. The composition of claim 17, wherein the compound represented by the formula (I) is a compound wherein X is represented by one of the following formulae:

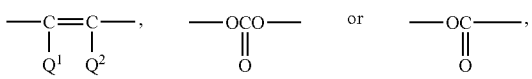

(wherein $Q^1$ and $Q^2$ are the same as defined above.)

19. The composition of claim 17, wherein the compound represented by the formula (I) is a compound wherein X is represented by the following formula:

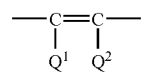

(wherein $Q^1$ and $Q^2$ are the same as defined above.)

20. The composition of claim 17, wherein the resin composition comprises the compound represented by the formula (I) in an amount of 0.5 to 10 parts by weight based on 100 parts by weight of the polycarbonate resin.

21. The composition of claim 17, wherein the polycarbonate resin is a polycarbonate resin having a viscosity average molecular weight of 10,000 to 30,000.

22. The composition of claim 17, wherein the polycarbonate resin is a polycarbonate resin obtained by use of 2,2-bis(4-hydroxyphenyl)propane as a dihydric phenol component.

23. A molded article formed of the polycarbonate resin composition of claim 17.

* * * * *